May 4, 1954
C. R. WAVAK
2,677,449
ONE-WAY ENGAGING DEVICE
Filed Feb. 4, 1950
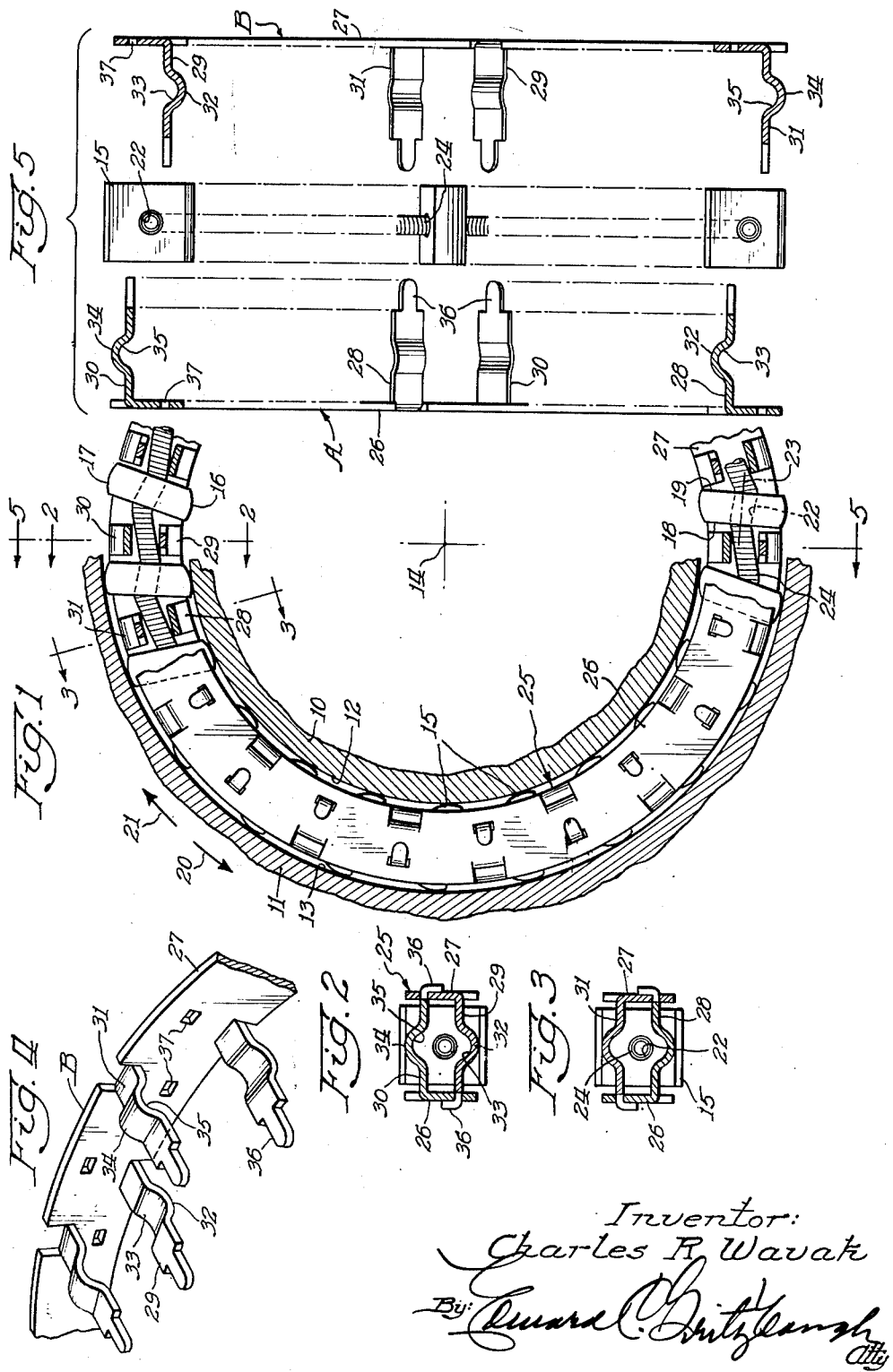
Inventor:
Charles R. Wavak Patented May 4, 1954

2,677,449

UNITED STATES PATENT OFFICE 2,677,449

ONE-WAY ENGAGING DEVICE

Charles R. Wavak, Villa Park, Ill., assignor to Borg-Warner Corporation, Chicago, Ill., a corporation of Illinois Application February 4, 1950, Serial No. 142,509

4 Claims. (Cl. 192—45.1)

The invention relates to one-way engaging devices and more particularly to such devices of the tilting sprag or gripper type.

A one-way engaging device of this type generally comprises opposite coaxial races between which tiltable sprags or grippers are disposed. The races generally are cylindrical, and they are inner and outer with respect to each other. The tiltable grippers or sprags have curved surfaces which contact and engage the inner and outer races on tilting of the sprags so as to engage the device. The tiltable sprags are generally held from movement from between the races by means of a cage, and the cage may be utilized for also holding the sprags in spaced relation with respect to each other.

It is an object of the invention to provide an improved cage for the grippers in an engaging device of this type which may be easily and economically manufactured from sheet metal.

More particularly it is an object of the invention to provide an improved cage of this type made up of two identical sheet metal stampings which are brought together and fixed together for providing the finished cage, the finished cage comprising a pair of sheet metal ring portions between which the sprags may be disposed connected by inner and outer cross portions that function to space the sprags with respect to each other and limit tilting of the sprags and half of the cross portions being integral with each ring portion.

It is a more specific object of the invention to provide an improved sprag cage of this type in which one ring portion has integrally formed therewith alternate outer cross portions and alternate inner cross portions, with corresponding inner and outer cross portions between each pair of adjacent sprags being integrally formed with the two opposite ring portions.

Generally, sprag engaging devices of this type include a garter spring extending through each of the sprags in such a direction as to tilt the sprags into engaging relation with the inner and outer races. It is another object of the invention to provide an improved sprag and cage assembly including inner and outer cross portions disposed between adjacent sprags which are located substantially closer together than the length of the sprags between their race engaging surfaces for limiting tilting of the sprags, with the cross portions being formed with inwardly bent portions in the inner cross portions and outwardly bent portions in the outer cross portions for allowing greater movement of the garter spring and thereby of the sprags and facilitating assembly of the sprag and cage between the inner and outer races.

The invention consists of the novel constructions, arrangements and devices to be hereinafter described and claimed for carrying out the above-stated objects and such other objects as will appear from the following description of a preferred embodiment of the invention illustrated with reference to the accompanying drawing, wherein:

Fig. 1 is a side elevational view of a one-way engaging device including my improved sprag and cage assembly which comprises two identical sheet metal cage halves;

Figs. 2 and 3 are sectional views taken respectively on lines 2—2 and 3—3 of Fig. 1 in the directions indicated;

Fig. 4 is a fragmentary perspective view of one of the cage halves; and

Fig. 5 is an exploded sectional view of the sprag and cage assembly taken on line 5—5 of Fig. 1, with the sprags and cage disassembled.

Like characters of reference designate like parts in the several views.

Referring now to the drawing, the one-way engaging device illustrated may be seen to comprise inner and outer members 10 and 11 provided respectively with an inner cylindrical race 12 and an outer, oppositely disposed, cylindrical race 13. The members 10 and 11 and their races 12 and 13 are coaxially disposed, having a common center indicated at 14.

A series of tiltable sprags or grippers 15 is disposed between the races 12 and 13, and each sprag 15 may be seen to have an inner arcuate race engaging surface 16, an outer arcuate race engaging surface 17, and flat side surfaces 18 and 19. The sprags 15 are tiltable, so that when the member 11 tends to rotate in the direction indicated by the arrow 20 with respect to the member 10, the sprags will rotate slightly in a counter-clockwise direction as seen in Fig. 1 with their outer arcuate surfaces 17 tending to move along with the outer member 11 and will engage the races 12 and 13 and prevent such movement of the outer member 11. On the other hand, when the outer member 11 tends to rotate in the opposite direction with respect to the member 10 as indicated by the arrow 21, the sprags 15 will tilt slightly in the clockwise direction as seen in Fig. 1, with their outer arcuate surfaces 17 tending to move along with the outer race 13, and will allow such movement of the outer member 11.

Each of the sprags 15 has an opening 22 drilled through it which lies at a slight angle with respect to a center line 23 of the sprag extending at right angles with respect to the faces 18 and 19. A garter spring 24 extends through the opening 22 in each of the sprags, and the arrangement is such that when the sprags are in their potential engaging positions in contact with both of the races 12 and 13, the sprags 15 hold the spring flexed and in a wavy configuration as shown in Fig. 1, with the race engaging surfaces 16 and 17 of each of the sprags in contact under spring pressure with the races 12 and 13.

A cage 25 is provided for the sprags. The cage comprises a pair of ring portions 26 and 27 disposed between the races 12 and 13 and connected by inner cross portions 28 and 29 and outer cross portions 30 and 31. The inner cross portions 29 and the outer cross portions 30 are radially disposed with respect to each other about the center 14, and the inner cross portions 28 and the outer cross portions 31 are radially disposed with respect to each other about the same center 14, as is apparent from Figs. 1, 2 and 3. The cross portions 28 and 31 and the cross portions 29 and 30 constitute pairs of cross portions which separate adjacent grippers 15.

The spring 24 extends between the two ring portions 26 and 27 and between the inner and outer cross portions. As is apparent from Figs. 2 and 3 in particular, the inner and outer cross portions are disposed substantially closer together than the distance between the race engaging surfaces 16 and 17 of the sprags, and the cross portions thus limit tilting of the sprags out of their proper positions between the cross portions. The inner cross portions 28 and 29 in their central regions are each provided with an inwardly curved part 32 providing a cavity 33 facing the opposite outer cross portions 31 and 30 respectively. The outer cross portions 30 and 31 in their central regions are each provided with similarly outwardly formed parts 34 forming a cavity 35 open to the opposite inner cross portions 29 and 28 and their cavities 33. The cavities 33 and 35 are of such size that the garter spring 24 may enter therein, so that the sprags may be moved inwardly and outwardly farther than would otherwise be possible for ease of assembling the sprag and cage assembly between the inner and outer races 12 and 13 and to assure a clearance between the inner and outer cross portions and the garter spring 24.

The outer cross portions 31 and the inner cross portions 29 are integral with the ring portion 27 and extend to the opposite ring portion 26, and the inner cross portions 28 and outer cross portions 30 are formed integral with the ring portion 26 and extend to the opposite ring portion 27. Each of these cross portions is provided with a tab 36 on its end which extends through a hole 37 formed in the ring portion to which the cross portion extends, and the tab is bent over on the latter ring portion in order to fix the ring portions 26 and 27 and the cross portions 28, 29, 30 and 31 with respect to each other to form the finished cage.

As is apparent from Fig. 5, the finished cage is formed from the two parts A and B, the part A including the ring portion 26 and the cross portions 28 and 30 and the part B including the ring portion 27 and the cross portions 29 and 31. These two parts A and B are identical, although when assembled they are rotated with respect to each other so that the inner cross portions of the part A lie between and alternate with the inner cross portions of the part B, and the same is true of the outer cross portions. The part B is shown in Fig. 4, and it will be seen from this illustration in particular that the inner and outer cross portions on the individual parts A and B alternate with each other around the ring portion of the part. The ring portions 26 and 27 and the cross portions 28, 29, 30 and 31 are all of sheet metal, and the cross portions constitute extensions on the inner and outer peripheries of the two ring portions. The parts A and B being identical, can be identical stampings made from the same set of tools and dies, and the cage 25 is, in effect, formed from two identical halves. The cage and sprags are assembled by first spacing the sprags 15 equidistantly around the garter spring 24 and then moving the two parts A and B together in the relation in which they are shown in Fig. 5 so as to bring the cross portions 29 and 30 between pairs of adjacent sprags and the cross portions 28 and 31 between alternate pairs of adjacent sprags. The tabs 36 are passed through the opposite openings 37 and the garter spring 24 is disposed between the inner cross portions 28 and 29 and the outer cross portions 30 and 31. The tabs 36 are then bent over to form the finished cage, the tabs on the outer cross portions 30 and 31 being bent inwardly and the tabs on the inner cross portions 28 and 29 being bent outwardly.

As so assembled, the cage functions to hold the sprags 15 in their proper spaced relation and for ready assembly between the members 10 and 11. The spring 24 which may move into the cavities 33 and 35 prevents the individual sprags from dropping out of the cage prior to assembly of the sprags and cage between the members 10 and 11. Due to the action of the spring, the sprag and cage assembly may be shipped as a unit for final assembly between the inner and outer races 10 and 11 without the possibility of any of the sprags coming out of position due to any jarring or rough handling during transportation. The sprags cannot, therefore, be misplaced in shipping or in handling or in assembly or disassembly of the one-way engaging device, and they cannot, through any mistake be turned around to engage in the wrong direction with respect to other sprags. Since the parts of the sprag and cage assembly are held in their correct positions with respect to each other, it is not necessary for a mechanic at the place of final assembly of the one-way engaging device to put the sprags into place relative to each other, nor is it necessary for him to be able to recognize the correct manner in which the sprags are assembled relative to each other.

My improved sprag cage is one that may be economically manufactured, since it may be formed from two identical stampings of sheet metal. Due to the fact that the inner cross portions 28 and 29 are spaced from the outer cross portions 30 and 31 substantially less than the length of the sprags between their race engaging surfaces 16 and 17, the cross portions effectively limit the tilting of the sprags, and the outwardly formed portions 32 and 34 in the cross portions allow sufficient radial movement of the garter spring 24 and sprags for ready assembly of the cage and sprag assembly between the members 10 and 11 and assure ample clearance between the cross portions and sprags.

I wish it to be understood that my invention

I claim:

1. A cage for a one-way engaging device for retaining a series of grippers between opposite coaxial spaced gripping surfaces and comprising two substantially identical sheet metal cage members each consisting of a sheet metal ring portion and a plurality of inner and outer sheet metal cross portions, said sheet metal ring portions being disposed in spaced relation and adapted to have the grippers disposed therebetween and the inner sheet metal cross portions and the outer sheet metal cross portions being arranged in pairs extending between said sheet metal ring portions, each pair of sheet metal cross portions being adapted to space two adjacent grippers and arranged in series with similar pairs for spacing the series of grippers, alternate inner and outer sheet metal cross portions constituting integral extensions on the inner and outer portions respectively of one of said sheet metal ring portions and the other inner and outer sheet metal cross portions constituting integral extensions on the inner and outer portions respectively of the other sheet metal ring portion, the sheet metal ring portion of each of said sheet metal cage members having integrally formed therewith one of the sheet metal cross portions of each pair and the sheet metal cross portions having their ends fixed to the sheet metal ring portion of the other sheet metal cage member to hold the sheet metal ring portions relatively fixed to each other.

2. A cage for a one-way engaging device for retaining a series of grippers between opposite coaxial spaced gripping surfaces and comprising two substantially identical sheet metal cage members each consisting of a sheet metal ring portion and a plurality of inner and outer sheet metal cross portions, said sheet metal ring portions being disposed in spaced relation and adapted to have the grippers disposed therebetween and the inner sheet metal cross portions and the outer sheet metal cross portions being arranged in pairs extending between said sheet metal ring portions, each pair of sheet metal cross portions being adapted to space two adjacent grippers and arranged in series with similar pairs for spacing the series of grippers, alternate inner and outer sheet metal cross portions constituting integral extensions on the inner and outer portions respectively of one of said sheet metal ring portions and the other inner and outer sheet metal cross portions constituting integral extensions on the inner and outer portions respectively of the other sheet metal ring portion, the sheet metal ring portion of each of said sheet metal cage members having integrally formed therewith one of the sheet metal cross portions of each pair and the sheet metal cross portions having their ends bent over the sheet metal ring portion of the other sheet metal cage member to hold the sheet metal ring portions relatively fixed to each other.

3. A cage for a one-way engaging device for retaining a series of grippers between opposite coaxial spaced gripping surfaces and comprising two substantially identical sheet metal cage members each consisting of a sheet metal ring portion and a plurality of inner and outer sheet metal cross portions, said sheet metal ring portions being disposed in spaced relation and adapted to have the grippers disposed therebetween and the inner sheet metal cross portions and the outer sheet metal cross portions being arranged in pairs extending between said sheet metal ring portions, each pair of sheet metal cross portions being adapted to space two adjacent grippers and arranged in series with similar pairs for spacing the series of grippers, the inner sheet metal cross portion and the outer sheet metal cross portion of each of said pairs being substantially radially disposed with respect to each other, each of said sheet metal ring portions having integral extensions on their inner and outer portions respectively defining said inner and outer sheet metal cross portions, each of said sheet metal ring portions having integrally formed therewith one of the sheet metal cross portions of each pair and the sheet metal cross portions having their ends projected through opposed openings formed in the other sheet metal ring portion and bent over the other sheet metal ring portion to hold the sheet metal ring portions relatively fixed to each other.

4. A cage for a one-way engaging device for retaining a series of tiltable grippers having a circular garter spring extending through them between opposite coaxial spaced gripping surfaces and comprising two substantially identical sheet metal cage members each consisting of a sheet metal ring portion and a plurality of inner and outer sheet metal cross portions, said sheet metal ring portions being disposed in spaced relation and adapted to have the grippers disposed therebetween, said sheet metal cross portions being arranged in pairs each comprising an inner cross portion and an outer cross portion for separating adjacent grippers, alternate inner and outer sheet metal cross portions on each of said sheet metal ring portions respectively comprising extensions on the inner and outer portion of each of said sheet metal ring portions which extensions are bent substantially at right angles to said sheet metal ring portions and are clinched over the other sheet metal ring portion to hold the sheet metal ring portions and sheet metal cross portions fixed with respect to each other, each of said sheet metal ring portions having integrally formed therewith one of the sheet metal cross portions of each pair and said inner sheet metal cross portions each being formed with an inwardly extending cavity open to the opposite outer sheet metal cross portion and each of said outer sheet metal cross portions being formed with an outwardly extending cavity open to the opposite inner sheet metal cross portion for providing for a greater radial movement of said spring and grippers.

References Cited in the file of this patent

UNITED STATES PATENTS

| Number | Name | Date |
| --- | --- | --- |
| 1,752,616 | Ryan | Apr. 1, 1930 |
| 1,915,118 | Brown | June 20, 1933 |
| 2,113,722 | Dodge | Apr. 12, 1938 |
| 2,404,221 | Dodge | July 16, 1946 |